United States Patent
Gibson et al.

(10) Patent No.: US 8,140,247 B2
(45) Date of Patent: Mar. 20, 2012

(54) CONTROL OF INTAKE PRESSURE FOR RESTART-ENABLED IDLE STOP

(75) Inventors: Alex O'Connor Gibson, Ann Arbor, MI (US); Joseph Norman Ulrey, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 639 days.

(21) Appl. No.: 12/266,080

(22) Filed: Nov. 6, 2008

(65) Prior Publication Data

US 2010/0114462 A1    May 6, 2010

(51) Int. Cl.
G06F 19/00 (2011.01)
G06G 7/70 (2006.01)
F02D 41/06 (2006.01)
F02M 1/00 (2006.01)

(52) U.S. Cl. ............... 701/113; 123/179.16; 123/179.18

(58) Field of Classification Search ............. 123/179.18, 123/179.4, 198 DB, 198 F, 325, 326, 481, 123/179.16; 701/112, 113
See application file for complete search history.

(56) References Cited

U.S. PATENT DOCUMENTS

| 4,515,124 | A | 5/1985 | Hayashi |
| 6,647,955 | B1 | 11/2003 | Sieber |
| 6,910,457 | B2 | 6/2005 | Grieser et al. |
| 7,051,514 | B2 * | 5/2006 | Midlam-Mohler ............ 60/278 |
| 7,096,840 | B2 | 8/2006 | Asada et al. |
| 7,357,109 | B2 | 4/2008 | Misuhori et al. |
| 7,757,665 | B2 * | 7/2010 | Tamai et al. .................. 123/481 |
| 2007/0261668 | A1 | 11/2007 | Kataoka et al. |
| 2008/0010001 | A1 * | 1/2008 | Lecole et al. ................ 701/112 |
| 2009/0070020 | A1 * | 3/2009 | Tetsuno ....................... 701/113 |
| 2010/0012086 | A1 * | 1/2010 | Demura ....................... 123/399 |
| 2010/0114461 | A1 | 5/2010 | Gibson |

FOREIGN PATENT DOCUMENTS

| DE | 102006043678 | 3/2008 |
| EP | 1367246 | 12/2003 |
| EP | 1403511 | 3/2004 |
| EP | 1582737 | 3/2005 |
| WO | 2006134470 | 12/2006 |

* cited by examiner

Primary Examiner — Stephen K Cronin
Assistant Examiner — Sizo Vilakazi
(74) Attorney, Agent, or Firm — Allan J. Lippa; Alleman Hall McCoy Russell & Tuttle LLP (57) ABSTRACT

Methods and systems are provided for controlling an engine of a vehicle. In one example, a throttle is adjusted improve engine restarting during an automatic engine stop where an operator requests an engine restart. The methods and systems may improve vehicle drivability.

4 Claims, 7 Drawing Sheets

CONTROL OF INTAKE PRESSURE FOR RESTART-ENABLED IDLE STOP

BACKGROUND

During operation of an automobile it may be desirable to bring the vehicle to a stop for a period of time, such as stopping at a traffic light, (hereafter "temporary stops"). Some vehicles may operate during temporary stops by idling an engine in an engine system. Other vehicles may stop the engine during temporary stops, even without a driver request to turn-off the engine, to reduce fuel consumption. For example, the vehicle may shutdown the engine by discontinuing fuel supply and/or ignition so that the engine spins down to rest. Then, once conditions indicate a driver's intent to launch the vehicle, the engine is automatically restarted.

During the shutdown of an engine in a vehicle, there may be air in one or more cylinders, in the engine. Air in one or more cylinders, known as "air charge", may compress and expand in the cylinder during shutdown, acting as a spring or an air cushion. In this way, enough air charge may cause a torque on the engine and produce undesired noise and vibration. Undesired noise and vibration may lead to an uncomfortable operating experience for a vehicle operator and may increase wear and tear on the engine. Methods and systems for closing a throttle in an intake coupled upstream of the engine to lower air charge in the engine are well known in the art, for example those disclosed in international patent WO 2006/134470 A1.

U.S. Patent Application 2007/0261668 describes a further method to control noise and vibration in an engine during shutdown and to restart the engine while the engine is still in the process of spinning down. Operating to restart the engine in spin down may be in response to a change of mind (COM) (e.g., due to indications of, or changes in, a driver's intent to launch the vehicle). An intake throttle may be controlled based on increasing air charge at a point of time when a restart request is made. Air may enter the engine, fuel may be injected, and ignition may resume following the injection of air and fuel. In this way an engine may be restarted at the end of a temporary stop, upon request of the vehicle operator to launch.

However, the inventors herein have recognized various issues with such an approach. In particular, closed throttle operation during shutdown may degrade attempts to restart the engine in mid-shutdown operation. For example, there may be insufficient air in the cylinder to generate sufficient torque via combustion to return the engine to idle speed and counteract the inertia of the engine decelerating to rest, especially at low engine speeds. Additionally, by opening the throttle at the time of a restart request, there may be a lapse in time between when the restart is requested and when air charge returns to a threshold level that may be necessary for restart. In this way, there may be a substantial delay between a restart request and enabling vehicle launch.

Similarly, the engine may have already spun down to a speed range in which the engine starter, if present, is unable to properly engage the spinning engine and increase engine speed sufficiently for starting. Rather, the engine may then fully spin down and utilize a re-start from rest, which may also generate a substantial delay in providing vehicle launch relative to the driver's request.

SUMMARY

Accordingly, methods and systems are provided for enabling the restart of an engine after discontinuation of combustion and during engine spin down. One example method for controlling an engine of a vehicle—the engine including an intake manifold, a cylinder, and an adjustable throttle upstream of the intake manifold—may comprise operating the engine with combustion, automatically initiating an engine shut down in response to operating conditions during a stopped vehicle idle condition without a shut-down request by the operator, adjusting the throttle to maintain manifold pressure at a first value during the automatically initiated engine shut down, adjusting the first value based on an operating parameter during progression of the shut down, and restarting the engine before it reaches zero speed in response to a restart request.

In alternate examples, the method may include adjusting the throttle to maintain manifold pressure at a first value during the automatically initiated engine shut down, while adjusting operation of the intake valve to maintain cylinder air amount, or air charge, below a second threshold value, where the first value is adjusted based at least on an operating parameter. In still further examples the method may further comprise varying manifold pressure along a desired trajectory by adjusting the throttle during the automatically initiated engine shut down, the trajectory increasing having an increased manifold pressure as engine speed decreases, at least during a first selected condition, and a decreased manifold pressure as engine speed decreases, at least during a second selected condition.

One feature of the examples presented above may be that intake manifold pressure may be controlled in a manner responsive to engine conditions, in order to enable restart in response to an operator's signal to launch. In one example, intake manifold pressure may track a desired pressure value, for example the first value described above. In another example, manifold pressure may follow desired trajectories during selected conditions, as described above. In this way, manifold pressure may be controlled in response to engine conditions, for example changes in barometric pressure, engine coolant temperature, air charge, engine speed and the like.

Another feature of the above described example methods may be that it is possible to maintain air charge below a level that produces substantial engine noise and vibration (e.g. engine shake) and maintain intake manifold pressure above a level that necessitates adjusting the intake throttle to restart the engine. In this way, engine noise and vibration (e.g., engine shake) may be reduced and a faster return to idle speed may be enabled. Such operation may be performed without requiring the engine to come to a complete stop; however, if desired, a complete stop may also be used. Similarly, the engine may be restarted during spin down without the use of a starter or other electric machine used for starting; however, again, if desired, the starter may also be used.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
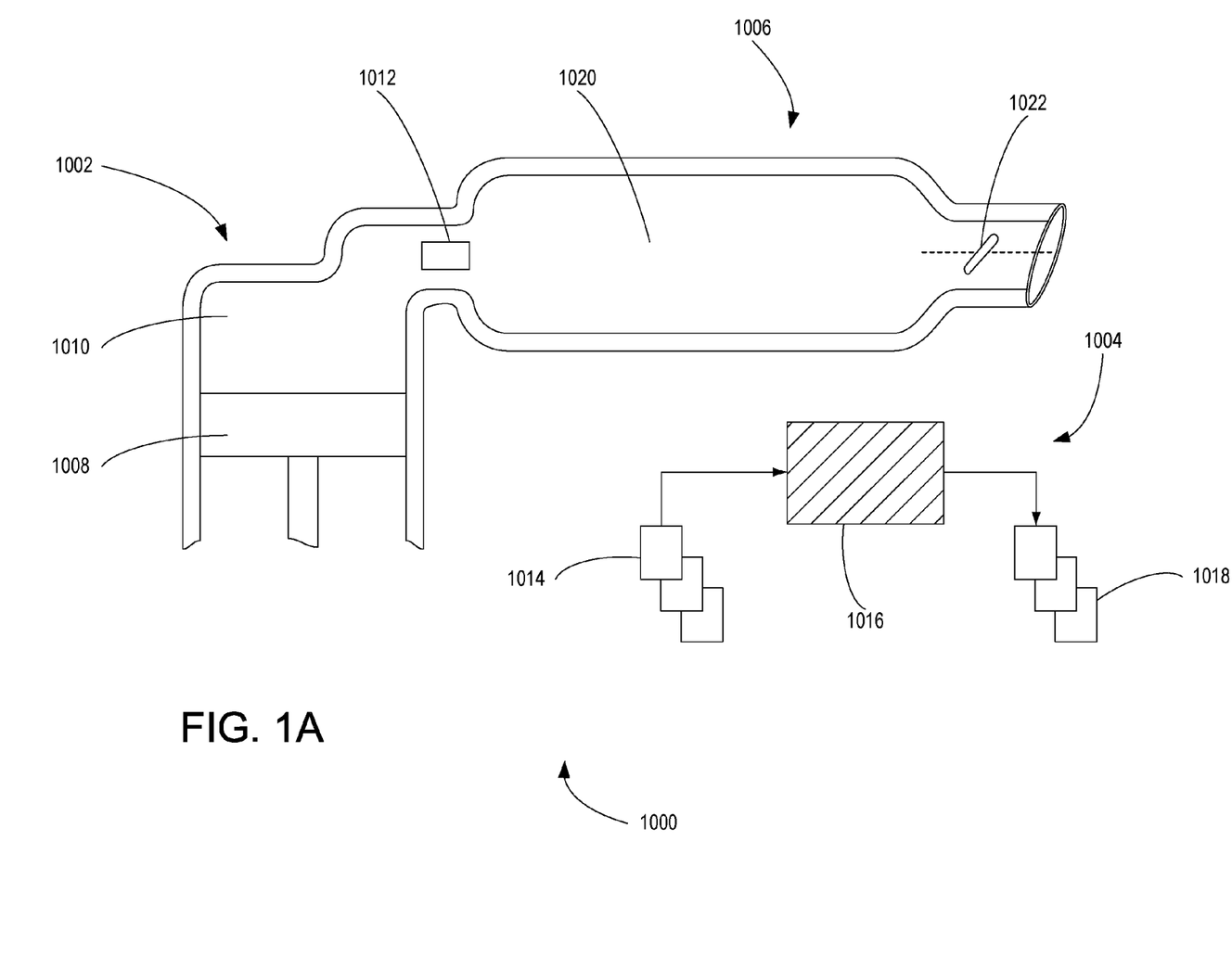
FIGS. 1A and 1B are schematic diagrams systems used to enable and carry out engine restart during engine spin down.

FIG. 1A depicts engine system 1000 for controlling engine shutdown and enabling engine restart after discontinuation of combustion and during engine spin down. The engine system 1000 includes an engine cylinder 1002 coupled to an engine control system 1004, and an intake 1006 coupled to the engine cylinder and to the engine control system. In alternate examples, there may be more than one engine cylinder coupled to the intake and the engine control system.

The engine cylinder 1002 includes a piston 1008, combustion chamber 1010, and a device for controlling air charge 1012 coupled between the combustion chamber and the intake. The piston may be driven by combustion in the combustion chamber and may be coupled to a crankshaft in a crankcase (not shown). The device 1012 may be in an opened state, partially opened state or closed state. In some examples, the device 1012 may be coupled to the control system 1004. In this way, the device 1012 may control the flow from the intake 1006 into the cylinder 1002. In some embodiments, the device 1012 includes a variable intake and/or exhaust valve mechanism such as an electric valve actuator, variable valve lift mechanism, variable cam timing mechanism, etc. In other embodiments, the device 1012 is a port throttle, such as an electrically actuated port throttle, positioned in an intake port between the cylinder intake valve(s) and the intake 1006.

While not show in FIG. 1A, the engine cylinder may further include an exhaust port, a spark plug and a fuel injector (such as a direct injector). The combustion chamber may facilitate the combustion of fuel after the fuel is injected by the fuel injector port and is ignited by the spark plug.

The intake 1006 may store air and direct air to a plurality of engine cylinders, including cylinder 1002. The intake includes an intake passageway 1020, which may be referred to as a manifold. The intake further includes a main engine throttle 1022 positioned upstream of a plurality of the engine cylinders (e.g., all of the engine cylinders). The throttle may be an adjustable intake throttle, intake throttle, engine throttle or the like. The throttle 1022 may be opened, partially opened or closed to control the flow of gases from the environment, into the intake passageway. In some examples, the main engine throttle may be coupled to the control system 1004. In further examples, the intake may be in fluid communication with the cylinder 1002.

In the present embodiment, the control system 1004 features a microcomputer 1016. The microcomputer may be used to monitor engine conditions and adjust various actuators. Signals 1014 from sensors in other components in the engine system may be input into the microcomputer. For example, a sensor may be coupled to the crankshaft to monitor engine speed and relay this information to the controller. The engine control system 1004 may be used to control engine system operations. Signals 1018 may be output to other components of the engine system. For example, the microcomputer may signal the adjustment (e.g., opening or closing) of device 1012 and/or throttle 1022.

The microcomputer may be further configured to carry out control of an air charge in the cylinder, an intake air pressure in the intake as well as fueling and ignition in the cylinder. For example, the microcomputer may be configured to operate the engine in combustion, specifically in an idle condition or state, which may be defined by an idle engine speed. In another example, the microcomputer may automatically initiate an engine shut down without a shut down request from a vehicle operator. In this way, during temporary stops, an engine in idle may be stopped to carry out an idle stop. In a further example, the microcomputer may be configured to carry out control of the engine system in response to signals containing information about engine operating conditions, for example barometric pressure inside the intake or another part of the engine system, or engine coolant temperature. Further still, the microcomputer may be configured to carry out automatic shutdown in response to other signals and/or during other engine states and conditions.

In general, air enters the engine system 1000 from the environment into the intake 1008. Air pressure may be measured in the intake 1006 and air charge in the cylinder 1002 by the controller 1016 via input signals 1014. The controller may send output signals 1018 to control the throttle 1022 and the air charge control device 1012. The throttle may rotate more open or more closed, controlling the flow rate at which air enters the intake. Air may then travel into the cylinder 1002. In the cylinder, air may mix with fuel and be combusted to move the piston 1008. In examples where the air charge control device includes a port throttle, and where opening and closing the port throttle may be controlled to adjust flow entering the cylinder. In other examples where the air charge control device includes a variable valve mechanism such as an electrically actuated valve (EVA), the air flow may be controlled by changing lift and/or timing of the valve.

Figure 1B:
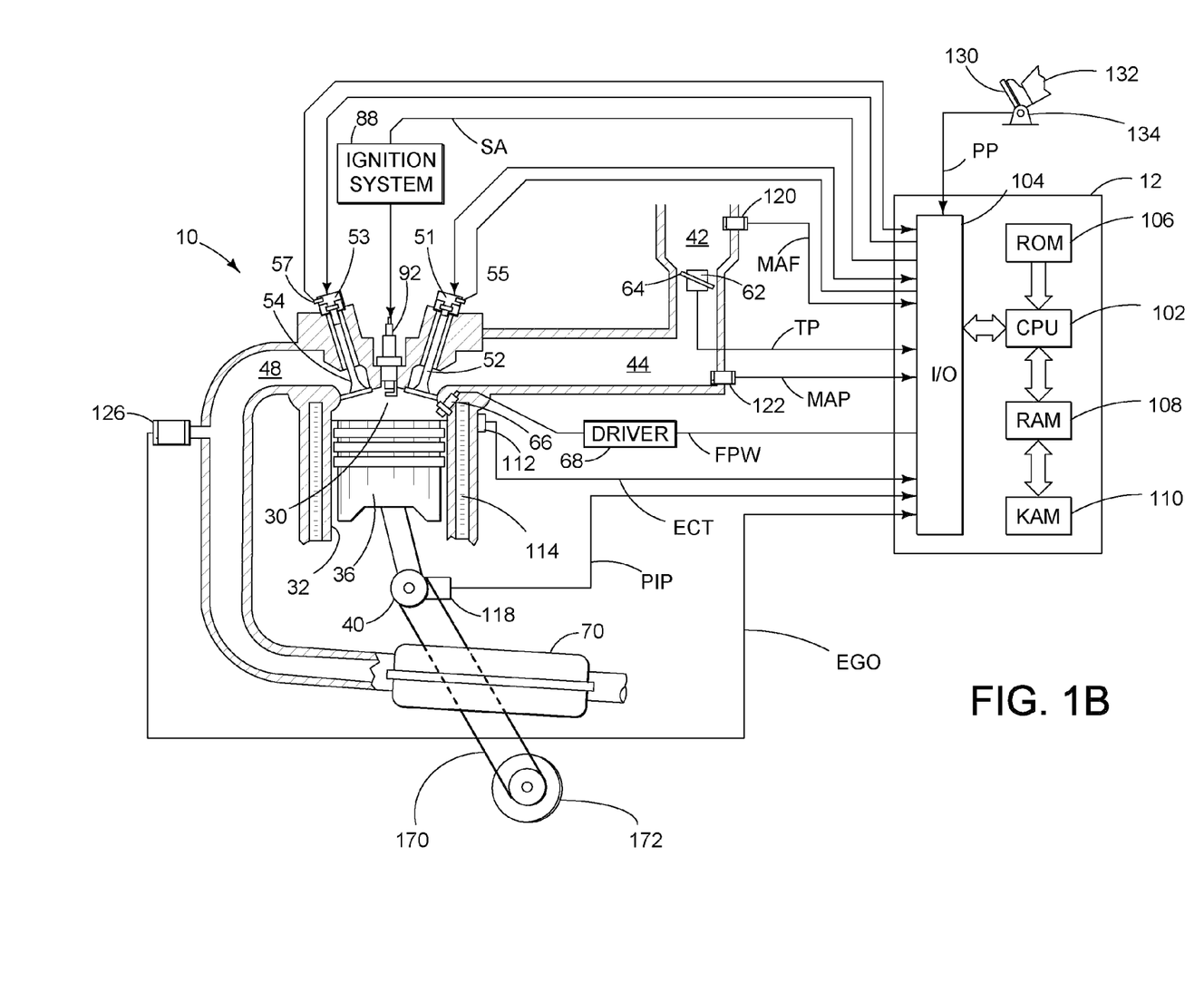

FIG. 1B is a schematic diagram showing one cylinder of multi-cylinder engine 10, which may be included in a propulsion system of an automobile. The propulsion system may be utilized to enable and carry out restart during spin down of engine 10. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor 172 may be coupled to crankshaft 40. In some embodiments the starter is coupled via a flywheel to enable a starting operation of engine 10. In the present embodiments, the starter is schematically coupled via a belt 170.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. Intake valve 52 is one example of air charge control device 1012. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively, which indicate displacement of the valve along an axis of the actuator. As another example, cylinder 30 may include an intake valve controlled via electric valve actuation and an exhaust valve controlled via cam actuation including cam profile switching (CPS) and/or variable cam timing (VCT).

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof.

Controller 12 is shown in FIG. 1B as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. In one example, sensor 118, which is also used as an engine speed sensor, may produce a predetermined number of equally spaced pulses every revolution of the crankshaft thereby indicating crankshaft position.

Storage medium read-only memory 106 can be programmed with computer readable data representing instructions executable by processor 102 for performing the methods or routines described below as well as other variants that are anticipated but not specifically listed.

As described above, FIG. 1B shows only one cylinder of a multi-cylinder engine, and each cylinder may similarly include its own set of intake/exhaust valves, valve position sensor(s), fuel injector, spark plug, etc.

Figure 2A:
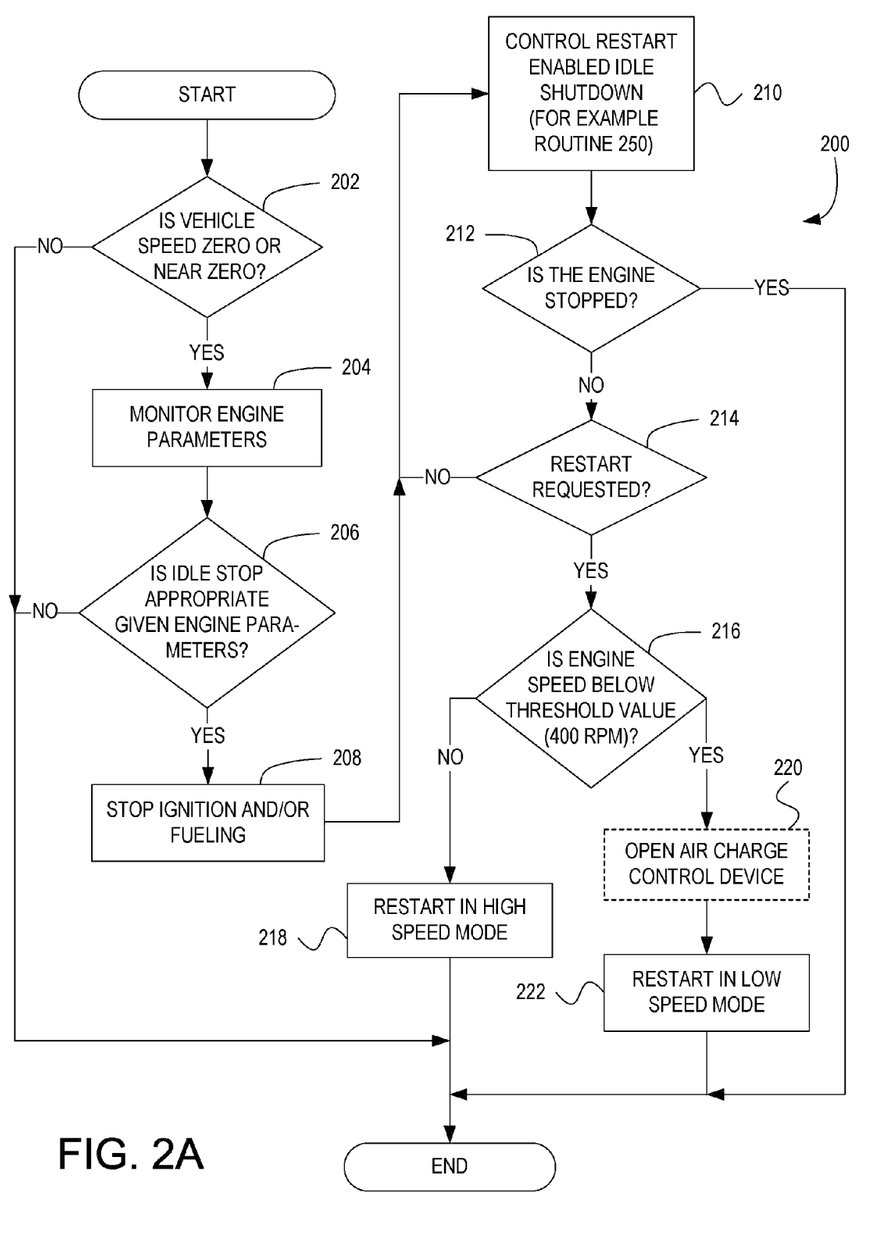
FIGS. 2A and 2B are flow charts depicting routines for enabling and carrying out an engine restart during engine spin down.
Figure 2B:
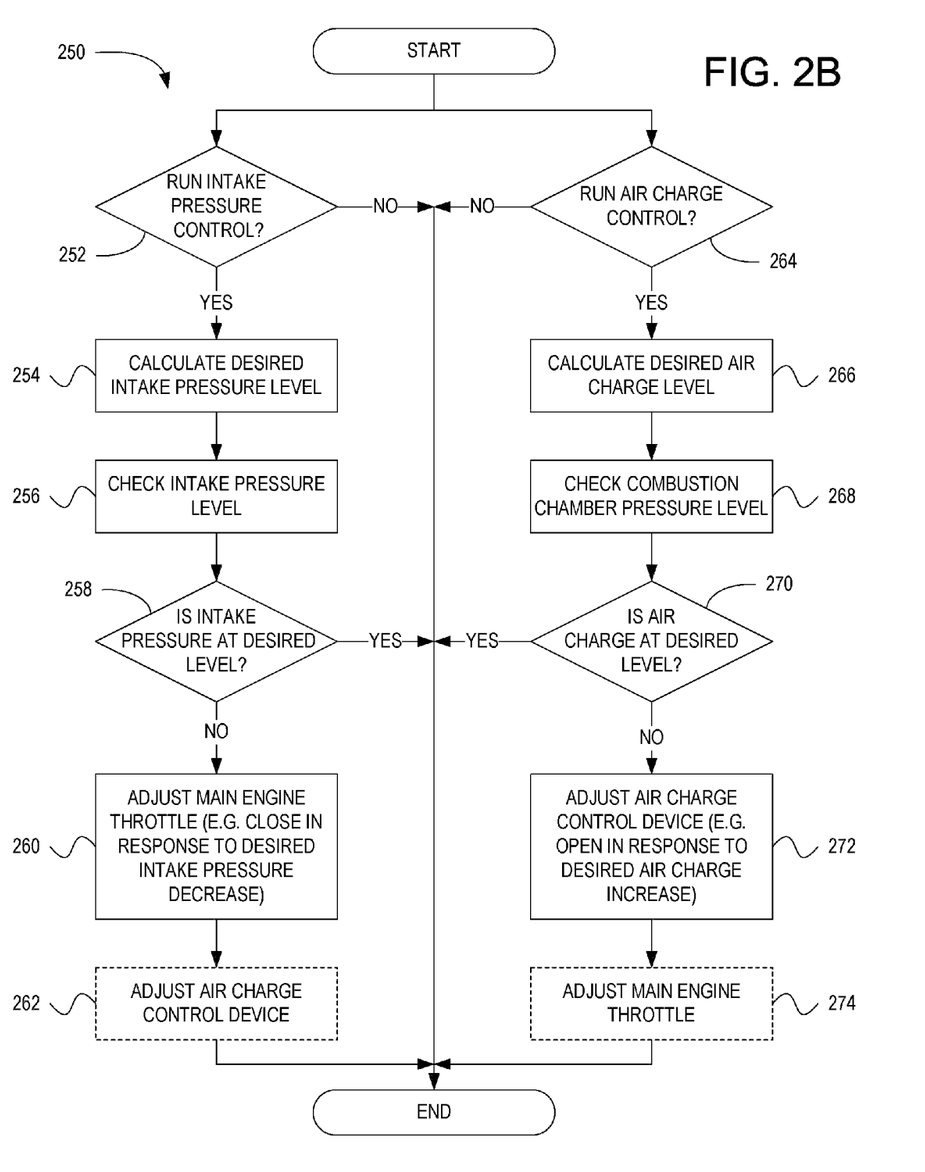

FIGS. 2A and 2B depict a routine for enabling and controlling engine shutdown operation and engine restart as the engine is still spinning down. In some examples, enabling restart may include monitoring engine parameters such as engine speed and temperature to calculate an intake pressure and air charge controlled for by an engine throttle. The control routine may be carried out in an engine controller in an engine system, one example of which is engine control system 12; another example of which is controller 1016. In the present embodiment refers to a single air charge control device. In alternate embodiments, the routine may use two or more air charge control devices.

Referring now to FIG. 2A, a main routine 200 is run in a controller in an engine system to enable and initiate engine shutdown. The routine commences with a decision 202 whether the vehicle speed is zero or close to zero. If the vehicle reaches zero speed or close to zero speed, a temporary stop may be initiated depending on engine speed and other operating conditions. During the vehicle operation the engine system may be operating the engine with combustion. In alternate embodiments, the routine may include a determination of whether the engine is running before further continuing on to 202. If the vehicle has stopped and the engine continues to run, for example at an idle engine speed, the engine and vehicle may be said to be in idle and the routine may continue to 204. In alternate examples, the decision 202 may not be included into routine 200 and the routine may continue to 204. Next, at 204, the routine monitors engine and other operating parameters. The operating parameters may be engine operating conditions and may include intake pressure, barometric engine pressure, crankcase temperature, engine coolant temperature, engine speed, battery charge, engine load and the like.

At 206, the routine determines whether to enable idle shutdown operation based on the monitored engine parameters. In one example, the monitored engine parameters may include whether engine accessories are engaged or in operation, such as whether an air conditioner compressor is engaged to the engine, or whether an engine fan is engaged and operating. If one or more engine accessories are engaged and/or in operation, idle shutdown may be disabled, and the control system may continue to operate and idle the engine during the stopped vehicle conditions. In another example, the monitored engine parameters may include whether an engine load is greater than a threshold value. Further still, the routine may monitor whether fuel usage is greater than a predetermined value. If the routine determines based on monitored engine parameters that idle shutdown is disabled, then the routine ends. In alternate embodiments, the routine may adjust engine operation in order to bring the monitored parameters into conditions in which an idle shutdown is enabled. In this way, the engine may make a decision as to whether to automatically initiate an engine shut down without a request by the operator.

If the routine determines an engine shutdown is enabled at 206, the routine continues to 208 to stop ignition and/or fueling. The routine may then proceed to 210, where control restart-enabled engine shutdown is carried out. Shutdown control may include spinning down the engine and controlling the air charge control device in the engine (one example of which is engine valve 52) and the main engine throttle (one example of which is engine throttle 62). In further examples, shutdown may include controlling the air charge control device and main engine throttle so that the intake pressure and air charge may track desired pressure values or follow desired trajectories. Further, air charge may be controlled so that it does not exceed a level causing a compression torque that may stop the engine before a restart, and does not deplete to a level insufficient to reverse engine speed deceleration. An example of process 210 is subroutine 250 of FIG. 2B, described below. In alternate examples, subroutine 210 may include setting the throttle and/or intake valve timing to predetermined shutdown values (e.g., setting the throttle to wide open throttle (WOT), and valve timing to a minimum air charge value).

Following the control process, the routine determines at 212 whether the engine is stopped. In the present example, if the engine is stopped, the routine ends. In alternate examples, a direct start or assisted direct start process may take place after the determination 212 that the engine has stopped. In other examples, the routine may restart the engine in a conventional manner with an engine starter.

If the engine is determined not to be stopped, a request to restart the engine at 214 may be made. A restart request may be a change of mind (COM) operation carried out by a vehicle operator. The operator may signal a COM by tip-in of an accelerator pedal, for example 130. In other examples, the COM may be signaled by release of a brake pedal. In still further examples, the routine may include processes and subroutines to automate the COM based on engine condition parameters. If the decision is made not to restart, the routine returns to 210 to control restart-enabled shutdown. In alternate embodiments of the routine, the routine may end if the request is made not to restart.

Following a restart request, the routine determines at 216 whether the engine speed is above a threshold value or a first threshold value. In the present embodiment the first threshold value is 400 rpm. In other embodiments, a threshold value of the engine speed may be greater than or lower than 400 rpm, or a range of threshold values may be used depending on operating conditions. Similarly, the determination may also depend on additional parameters, such as whether pressure in the intake is great than a threshold.

If the engine speed is above the first threshold value, the routine continues to 218 to carry out restart in high speed mode. Restart in high speed mode may involve firing one or more sparkplugs and injecting fuel from one or more fuel ports. In some examples, restart in high speed mode may include calculating a high speed restart trajectory, where one or more engine speeds is assigned to one or more future times. Further, the high speed restart trajectory may be used in control of air charge in one or more cylinders and/or intake pressure at a desired air charge level or a desired intake pressure level, for example, at levels substantially similar to when the engine is in an idle state. Further still, the high speed restart trajectory may be used in control of air charge in one or more cylinders and/or intake pressure below a desired air charge or a desired intake pressure, and then to increase air charge and/or intake pressure to desired levels in response to engine operating conditions. For example, a high speed restart trajectory may control intake manifold pressure at a lower level, in some cases to suppress NVH, and then may increase intake manifold pressure to a higher level in response to engine speed falling below a second threshold value. In some examples the second threshold value may be 450 revolutions per minute to enable restart and increasing intake manifold pressure may enable restart at engine speeds below a first threshold level, for example 400 revolutions per minute.

In still further examples, restart in high speed mode may include fueling one or more cylinders according to the high speed restart trajectory, and opening one or more air charge control devices according to the high speed restart trajectory. After restart, the routine may end.

If the engine speed is below the threshold value, the routine may go to 220 to open air charge control device. In some examples, open air charge control device may include more than one air charge control device coupled to more than one cylinder. The box at 220 is dashed to indicate that in some examples of the routine the process to open one or more air charge control devices may be optional, for example in the case where air charge is already at or above a threshold value for restart. An example of opening an air charge control device is increasing valve lift. Another example of opening an air charge control device is increasing valve timing. In this way, air charge may be increased to a desired air charge level for restart while the engine is spinning down.

After opening one or more air charge control devices, the routine continues to 222 to carry out restart in low speed mode. Restart in low speed mode may involve firing one or more sparkplugs and injecting fuel from one or more fuel ports. In some examples, restart in low speed mode may further include injecting more fuel than restart in high speed mode, described above. In other examples, restart in low speed mode may include advancing spark timing more than restart in high speed mode. In further examples, restart in low speed mode may include calculating a low speed restart trajectory, where one or more engine speeds is assigned to one or more future times. Further, the low speed restart trajectory may be used in control of air charge in one or more cylinders and/or intake pressure at a desired air charge level or a desired intake pressure level, for example, at levels substantially similar to when the engine is in an idle state. Further still, the low speed restart trajectory may be used in control of air charge in one or more cylinders and/or intake pressure at a lower level, and then to increase air charge and/or intake pressure to higher levels in response to engine operating conditions, in a manner similar to that described above, for example to suppress NVH.

In still further examples, restart in low speed mode may include fueling one or more cylinders according to the low speed restart trajectory, opening one or more air charge control devices according to the low speed restart trajectory, and opening the main engine throttle according to the low speed restart trajectory. After restart the routine may end.

Referring now to FIG. 2B, a subroutine 252 for controlling air charge and intake pressure is depicted. Subroutine 250 is one embodiment of subroutine 210 to control restart-enabled shutdown. Further, subroutine 250 may be an example of a method used to control air charge and intake pressure according to a trajectory, for example a high speed restart trajectory and a low speed restart trajectory.

The subroutine starts with determinations at 252 and 264. At determination 252, the routine decides whether to control intake pressure. At determination 264 the routine decides whether to control air charge. The control of intake pressure and/or air charge may include the adjustment of devices responsive to a desired shutdown trajectory. In the present embodiment the choice to run control of intake pressure at 252 is run in parallel with the choice to run air charge control at 264. In alternate embodiments, intake pressure control may be run in series with air charge control. In still further embodiments, only intake pressure is controlled and may include processes to control air charge subsequently by the changes in intake pressure.

Intake pressure control may begin at 254 to calculate a desired intake pressure level. Once a desired intake pressure level is calculated, the routine continues to 256 to check intake pressure level. A determination 258 is then made as to whether the checked intake pressure level is close enough to the desired intake pressure level. If the checked intake pressure is close enough to the desired, then the subroutine may conclude.

If the pressure is not close enough to the desired intake pressure level, then the routine may proceed to 260 where it may adjust main engine throttle. Adjusting the main engine throttle may include opening the throttle in response to a calculated desired intake pressure level that is greater than a checked intake pressure level. Adjusting the main engine throttle may include closing the throttle in response to a calculated desired intake pressure level that is less than a checked intake pressure level. In some examples, the routine further continues to 262, where it may adjust air charge control device, such as described below at 272. In this way, intake pressure may be controlled, and further action may be carried out in response to the checked intake pressure level being greater than or less than the desired intake pressure level. After process 262, the subroutine may end. In alternate examples of the routine that do not include 262, the subroutine may conclude after 260.

Air charge control may be conducted in a manner very similar to that of intake pressure control. Air charge control may begin at 264 to calculate desired air charge level. Once a desired air charge level is calculated, the routine continues to 266 to check air charge level. A determination 270 is then made as to whether the checked air charge level is close enough to the calculated desired air charge level. If the checked air charge level is close enough to the calculated desired air charge level, then the subroutine may conclude.

If the checked air charge level is not close enough to the calculated desired air charge level, then the routine may proceed to 272 where it may adjust air charge control device. Adjusting the air charge control device may include opening the air charge control device in response to a calculated desired air charge level that is greater than a checked air charge level. Adjusting the air charge control device may include closing the air charge control device in response to a calculated desired air charge level that is less than a checked air charge level. Opening the air charge control device may be increasing valve lift, opening a port throttle, and/or increasing valve timing, as described above in FIG. 1A. Closing the air charge control device may be decreasing valve lift, closing a port throttle, and/or decreasing valve timing, as described above in FIG. 1A as well.

In some examples, the routine further continues to 274, where it may adjust the main engine throttle, such as described above at 260. In this way, air charge may be controlled, and further action may be carried out in response to the checked air charge level being greater than or less than the calculated desired air charge level. After process 274, the subroutine may end. In alternate examples of the routine that do not include 274, the subroutine may conclude after 272.

In this way, shutdown may include controlling the air charge control device and main engine throttle so that the intake pressure and air charge may track desired pressure values or follow desired trajectories. In alternate embodiments, the air charge is controlled by setting the air charge control device to a predetermined open value and allowing for fluid communication with the intake. By setting the air charge control device to a predetermined open value, the throttle may be used to control both the air charge and the intake pressure.

Methods, such as the example described above, may be used on engines that feature assisted direct restart (ADS) or direct start starting methods. Methods, such as the example above, may be used on conventional starter assisted engines as well.

Figure 3A:
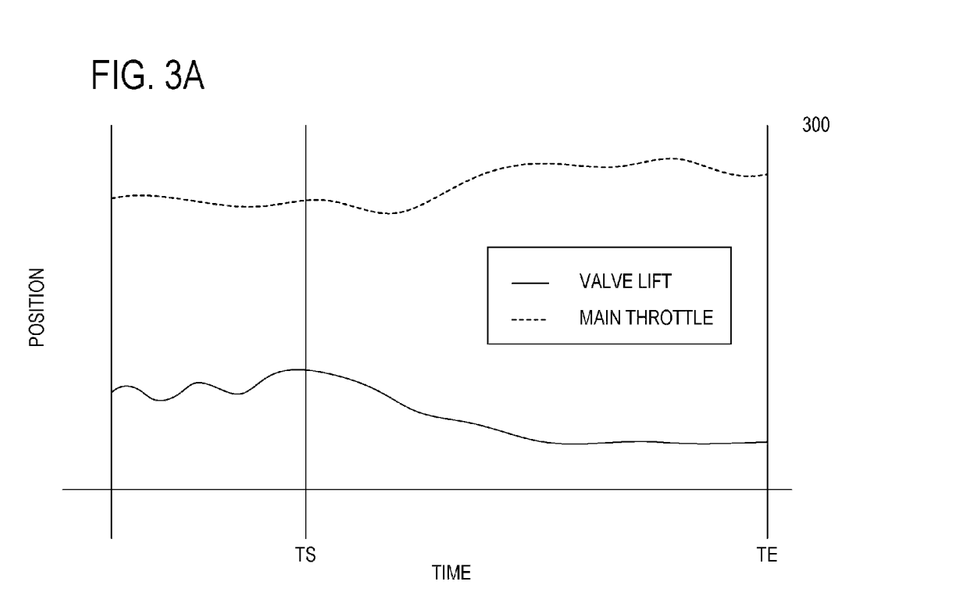
FIGS. 3A-3C are graphs showing position variation in systems enabling and carrying out a restart.
Figure 3B:
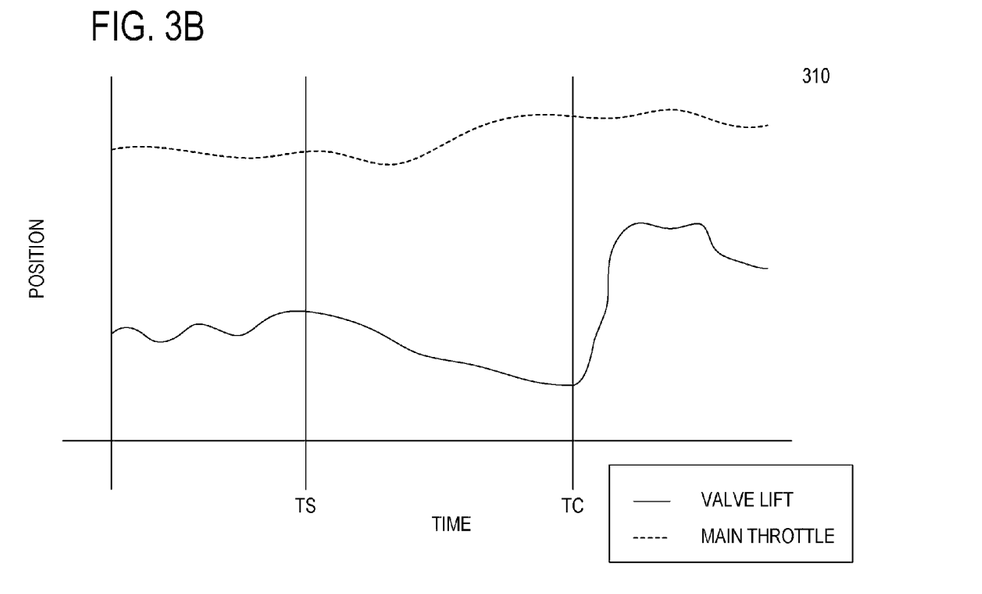
Figure 3C:
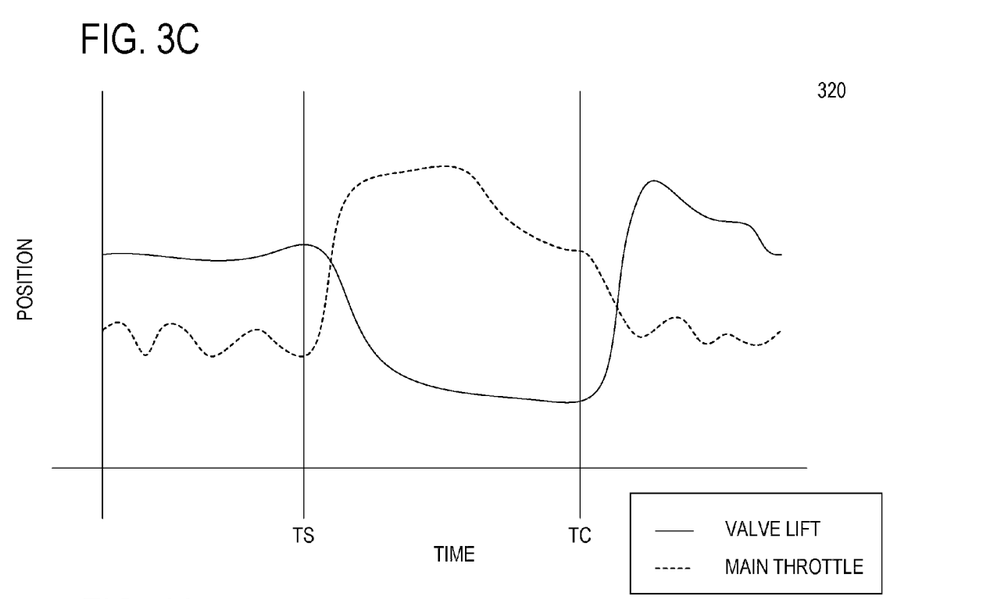

FIGS. 3A-C show graphs depicting position of a throttle valve and the lift of an example cylinder valve in an engine system over time. The engine system further includes a controller carrying out a routine, for example routine 200 and subroutine 250, to control restart-enabled shutdown and restart during engine spin down. The position the throttle valve may be correlated to a manifold air pressure (MAP) as described above. Valve lift may be the air charge controller discussed above and may be correlated to cylinder pressure. Further, restart may be carried out according to a trajectory, where one or more engine speeds is assigned to one or more future times. Further still, future values of MAP and air charge may be assigned or correlated to future times and may be controlled for using the throttle and valve lift. In the depicted graphs, position increases along the y axis and time along the x axis.

Referring now to FIG. 3A, graph 300 depicts the position of the throttle and valve lift during an engine shutdown. Initially valve lift is small and throttle position is near open. Initially, valve lift and throttle position may be controlled to achieve maximum fuel economy, torque, and the like. At time TS, the engine begins idle shutdown. After TS, valve lift decreases to maintain air charge in the cylinder. Throttle position may increase to wide open throttle (WOT) to enable maximal MAP. In the event of a charge of mind, maximal MAP enables a quick increase in cylinder air charge, further enabling rapid restarting of the engine, as discussed below in FIG. 4A. In alternate examples, MAP is maintained at a relatively high valve, but is not maximal. As the engine spins down, it may come to a stop at time TE.

Referring now to FIG. 3B, graph 310 depicts a similar condition as graph 300, during engine shutdown and a change of mind to restart the engine. As above, initially valve lift is small and throttle position is near open. After TS, valve lift decreases to maintain air charge and throttle position increases to increase MAP. At time TC, the engine is restarted before engine speed reaches zero. Valve lift increases which may enable the flow of air from the intake into the cylinder. In this way air charge may be increased to enable restart.

Referring now to FIG. 3C, graph 320 depicts another example of throttle and lift positions during shutdown. The throttle is initially more closed, and similarly the lift is more open than in the above examples. After the engine enters spin down at time TS, lift is decreased and the throttle opened in order to control cylinder air charge and MAP. In the present example, the throttle may close over a period before restart at time TC in order to decrease MAP (see FIG. 4B below). The lift may also decrease over the same period of time. In this way, engine noise, vibrations and harshness (NVH) may be suppressed, to lower engine ware and tear, and enhance operator experience.

Figure 4A:
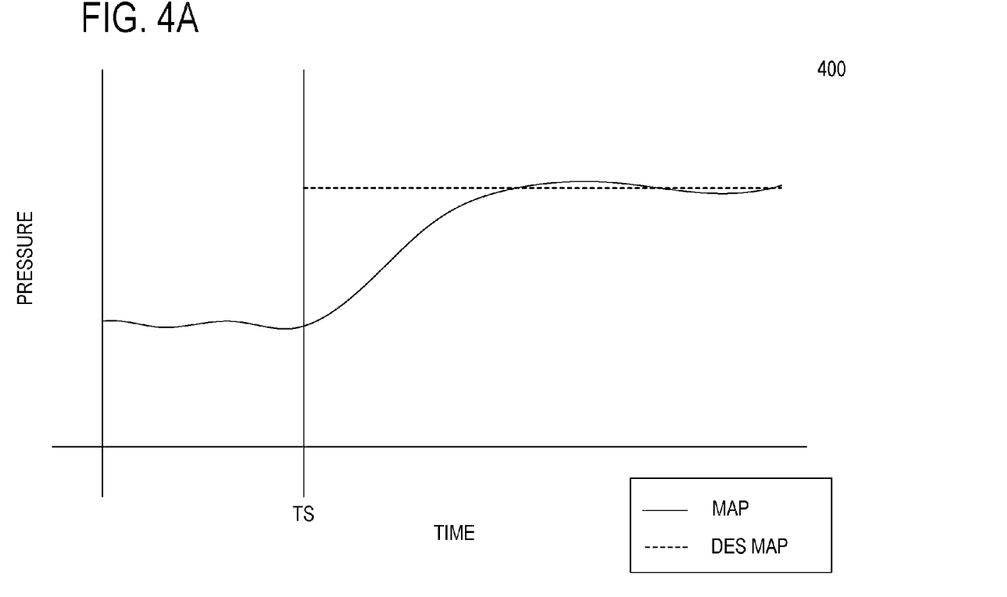
FIGS. 4A and 4B are graphs showing pressure in a system used to enable and carry out a restart.
Figure 4B:
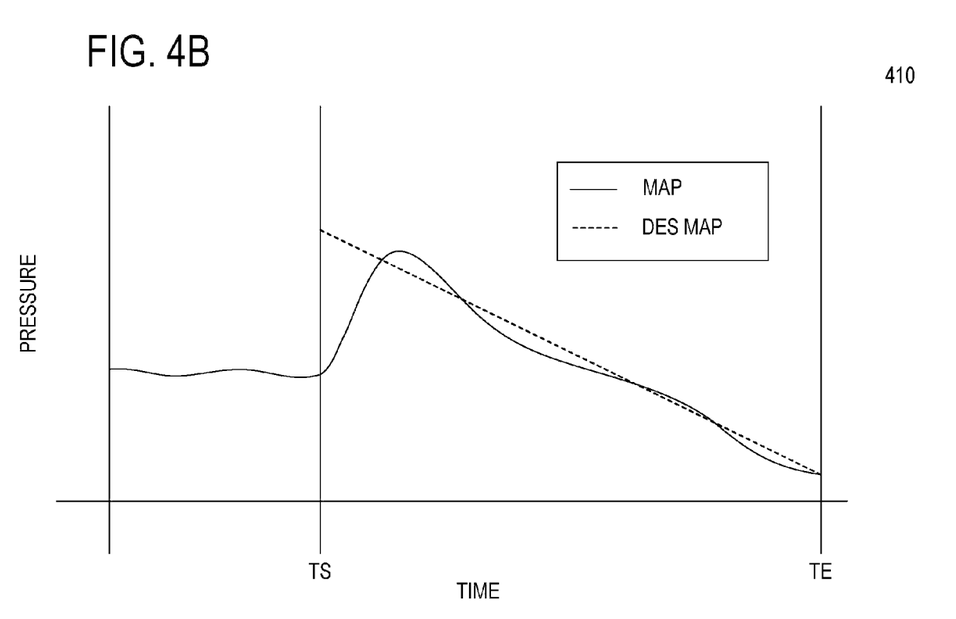

FIGS. 4A and 4B show graphs of pressure in an intake of an engine system carrying out restart-enabled engine shutdown and restart. The graphs show pressure increasing vertically along the y axis and time increasing along the x axis. Restart-enabled engine shutdown may include controlling the air charge control device and main engine throttle so that the intake pressure and air charge may track desired pressure values or follow calculated trajectories. These pressures may be measured and controlled as part of a routine or subroutine to control engine parameters during shutdown, for example routine 200 and subroutine 250. MAP pressure may be controlled by an engine throttle position, examples of which are depicted in FIGS. 3A-C and discussed above.

Referring now to FIG. 4A, graph 400 shows MAP controlled to be near a constant desired intake pressure DES MAP. Graph 400 may be one example of a MAP controlled according to a restart trajectory. Before engine shutdown at time TS, intake pressure is low and relatively constant, for example at idle pressure. In alternate examples, intake pressure may be decreasing, as would a vehicle in motion coming to a stop. After TS, intake pressure is increased to DES MAP, so that air charge in one or more cylinders may be increased upon an engine restart. Further, DES MAP is at or substantially similar to a MAP when the engine is in idle. For example, the MAP when the engine is in idle may be equal to or approximately 0.35 Bar and may depend upon an engine configuration and friction in the engine. The pressure is maintained at DES MAP throughout the period of engine shutdown. This may be the case when a throttle valve remains in an open position, as in 300 and 310 above.

Further, in alternate examples the value of MAP over time may depend upon the initial engine operating conditions when the engine initiates shutdown. If the engine is initially in an idle state, e.g. MAP is in the stabilized idle state, the commanded MAP trajectory may be substantially maintained during the shut-down. If the engine is initially at a load which is greater than the load at idle, then the desired MAP trajectory may decreased toward the idle value from its initial value before a first threshold engine speed is reached, for example 400 revolutions per minute. Further, if the engine is initially at a load which is lower than the load at idle, then the desired MAP trajectory may increase up to the idle value before a first threshold engine speed is reached, for example 400 revolutions per minute. Thus, MAP may be controlled over time according to a desired trajectory.

Referring now to FIG. 4B, graph 410 shows MAP controlled to be a non-constant desired intake pressure DES MAP. Graph 410 may show one example of a MAP controlled according to a desired trajectory. As in graph 400, before engine shutdown time TS, intake pressure is low and relatively constant. After TS, intake pressure is increased to DES MAP. In the present embodiment of the graph, DES MAP is a linear curve decreasing over time. In alternate embodiments, it may be represented by other alternate curves, for example by logarithmic or parabolic curves. A non-constant, decreasing MAP may limit intake pressure and cylinder air charge to levels below which engine NVH may be damaging to an engine system or unpleasant to a vehicle operator, while still maintaining air charge above a threshold valve for restart. In the present example, the pressure is controlled until the engine speed reaches zero at time TE. In alternate examples, the engine may restart at a time before TE and after TS and MAP may increase or decrease after ignition and injection have restarted, for example, according to a desired fuel to air ratio.

Further, DES MAP may take on a linearly decreasing value for a duration, but may remain constant or may increase again in response to the engine speed dropping below a second threshold value, for example 450 revolutions per minute. During increases in DES MAP, cylinder air charge may be maintained at levels below which engine NVH may be damaging to an engine system or unpleasant to a vehicle operator. Further, cylinder air charge may be increased in response to the engine speed dropping below a second engine threshold value. In still further examples, the second threshold value may be chosen to reflect engine configuration and/or engine responsiveness. For example, a gasoline engine may decelerate from 600 revolutions per minute to 0 revolutions per minute in 400 milliseconds (ms), whereas a diesel engine may decelerate from 600 revolutions per minute to 0 revolutions per minute in 1500 ms. For this reason, a second threshold value of a gasoline engine may be greater than a second threshold value of a diesel engine, so that a gasoline engine may be given more time to increase MAP, relative to a diesel engine.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the control system.

It will be appreciated that the configurations and routines disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling an engine of a vehicle, the engine including an intake manifold and a cylinder, the engine further including an adjustable throttle upstream of the intake manifold, the method comprising:
    operating the engine with combustion;
    in response to operating conditions and during a stopped vehicle idle condition, and without a shut-down request by an operator, automatically initiating an engine shut down;
    during the automatically initiated engine shut down, adjusting the throttle to maintain manifold pressure at a first value, where during progression of the shut down, the first value is adjusted based on barometric pressure and engine coolant temperature; and
    restarting the engine before it reaches zero speed in response to a restart request.

2. The method of claim 1 wherein the automatic initiation of engine shut down occurs during a stopped vehicle idle condition in which the engine was idling at an engine idle speed, and where the progression of the shut down is based on manifold pressure at initiation of the engine shut down.

3. The method of claim 2 wherein the first value is increased as engine speed decreases from the engine idle speed, and where the throttle is adjusted to maintain manifold pressure at the increasing value during the engine shut down.

4. A method for controlling an engine of a vehicle, the engine including an intake manifold and a cylinder, the engine further including an adjustable throttle upstream of the intake manifold, the method comprising:

operating the engine with combustion;

in response to operating conditions and during a stopped vehicle idle condition, and without a shut-down request by an operator, automatically initiating an engine shut down;

during the automatically initiated engine shut down, varying manifold pressure along a desired trajectory that is based on engine coolant temperature by adjusting the throttle, the trajectory having an increased manifold pressure as engine speed decreases, at least during a first selected condition, and a decreased manifold pressure as engine speed decreases, at least during a second selected condition.

* * * * *